US009446789B2

(12) United States Patent
Tsubaki et al.

(10) Patent No.: US 9,446,789 B2
(45) Date of Patent: Sep. 20, 2016

(54) ELECTRIC POWER STEERING APPARATUS

(71) Applicant: NSK LTD., Shinagawa-Ku, Tokyo (JP)

(72) Inventors: Takahiro Tsubaki, Gunma (JP); Tetsuya Kitazume, Gunma (JP); Keita Yoshida, Gunma (JP)

(73) Assignee: NSK LTD., Tokyo (JP)

( * ) Notice: Subject to any disclaimer, the term of this patent is extended or adjusted under 35 U.S.C. 154(b) by 65 days.

(21) Appl. No.: 14/419,085

(22) PCT Filed: Feb. 3, 2014

(86) PCT No.: PCT/JP2014/052459
§ 371 (c)(1),
(2) Date: Feb. 2, 2015

(87) PCT Pub. No.: WO2014/136515
PCT Pub. Date: Sep. 12, 2014

(65) Prior Publication Data
US 2015/0191200 A1 Jul. 9, 2015

(30) Foreign Application Priority Data

Mar. 8, 2013 (JP) ................................ 2013-046178
Mar. 22, 2013 (JP) ................................ 2013-059901

(51) Int. Cl.
*B62D 5/04* (2006.01)
*B62D 15/02* (2006.01)
*B62D 6/00* (2006.01)

(52) U.S. Cl.
CPC ............. *B62D 5/0472* (2013.01); *B62D 6/002* (2013.01); *B62D 15/025* (2013.01); *B62D 15/0285* (2013.01); *B62D 5/046* (2013.01); *B62D 5/0463* (2013.01); *B62D 6/008* (2013.01)

(58) Field of Classification Search
CPC ............. B62D 5/0463; B62D 5/0472; B62D 15/0285; B62D 15/025; B62D 6/002; B62D 5/046; B62D 5/0409; B62D 6/008
See application file for complete search history.

(56) References Cited

U.S. PATENT DOCUMENTS

| 7,265,509 | B2* | 9/2007 | Endo | B62D 5/0472 180/443 |
|---|---|---|---|---|
| 9,327,761 | B2* | 5/2016 | Tsubaki | B62D 5/0463 |
| 2006/0012323 | A1* | 1/2006 | Endo | B62D 5/0472 318/432 |
| 2008/0228354 | A1* | 9/2008 | Kimura | B62D 5/0472 701/42 |
| 2009/0000857 | A1* | 1/2009 | Sugiyama | B62D 5/0472 180/444 |
| 2011/0018487 | A1* | 1/2011 | Nagase | B62D 5/0463 318/800 |

(Continued)

FOREIGN PATENT DOCUMENTS

| JP | 63-19386 B2 | 4/1988 |
|---|---|---|
| JP | 08-142886 A | 6/1996 |

(Continued)

OTHER PUBLICATIONS

International Search Report of PCT/JP2014/052459 dated Apr. 28, 2014 [PCT/ISA/210].

*Primary Examiner* — Jason Holloway
(74) *Attorney, Agent, or Firm* — Sughrue Mion, PLLC

(57) ABSTRACT

An electric power steering apparatus that realizes vibration suppression of response characteristics and has a control performance having resistance properties against disturbances such as a road surface change by using a velocity I-P control (a proportional-lead type PI control) in a vehicle having functions of an automatic steering control and a manual steering control.

20 Claims, 13 Drawing Sheets

(56) References Cited

U.S. PATENT DOCUMENTS

| | | | |
|---|---|---|---|
| 2011/0276229 A1* | 11/2011 | Sugawara | B62D 5/0466 701/42 |
| 2011/0282551 A1* | 11/2011 | Sasaki | B62D 5/0463 701/42 |

FOREIGN PATENT DOCUMENTS

| | | |
|---|---|---|
| JP | 08-310417 A | 11/1996 |
| JP | 2002-369565 A | 12/2002 |
| JP | 2004-017881 A | 1/2004 |
| JP | 2004-042769 A | 2/2004 |
| JP | 2006-123663 A | 5/2006 |
| JP | 3917008 B2 | 5/2007 |
| JP | 2009-051278 A | 3/2009 |
| JP | 2010-100091 A | 5/2010 |
| JP | 2012-106678 A | 6/2012 |
| JP | 5068327 B2 | 11/2012 |

* cited by examiner

PRIOR ART

PRIOR ART

ELECTRIC POWER STEERING APPARATUS

CROSS REFERENCE TO RELATED APPLICATIONS

This application is a National Stage of International Application No. PCT/JP2014/052459, filed Feb. 3, 2014, claiming priorities based on Japanese Patent Application Nos. 2013-046178, filed Mar. 8, 2013 and 2013-059901, filed Mar. 22, 2013, the contents of all of which are incorporated herein by reference in their entirety.

TECHNICAL FIELD

The present invention relates to an electric power steering apparatus that has functions of an automatic steering control (parking support mode) and a manual steering control and provides a steering system of a vehicle with an assist force generated by a motor, and in particular to an electric power steering apparatus capable of improving performances and suppressing a steering wheel vibration occurring during the automatic steering control by performing a steering angle control that carries out an automatic steering which makes an actual steering angle follow up a target steering angle with a high accuracy and without using any particular parts while suppressing the vibration.

BACKGROUND ART

An electric power steering apparatus (EPS) which provides a steering mechanism of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism. In order to accurately generate the steering assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a PWM (Pulse Width Modulation) control.

A general configuration of the conventional electric power steering apparatus will be described with reference to FIG. 1. As shown in FIG. 1, a column shaft (a steering shaft or a handle shaft) 2 connected to a steering wheel (a handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (ECU) 100 for controlling the electric power steering apparatus from a battery 13, and an ignition key signal is inputted into the control unit 100 through an ignition key 11. The control unit 100 calculates a steering assist command value of an assist (steering assist) command on the basis of a steering torque Th detected by the torque sensor 10 and a vehicle velocity Vel detected by a vehicle velocity sensor 12, and controls a current supplied to the motor 20 on the basis of a current control value E obtained by performing compensation and so on with respect to the steering assist command value. Moreover, it is also possible to receive the vehicle velocity Vel from a CAN (Controller Area Network) and so on.

In such an electric power steering apparatus, the control unit 100 has a configuration such as disclosed in Japanese Published Unexamined Patent Application No.2002-369565 A.

As shown in FIG. 2, the motor 20 for generating the steering assist torque of the steering apparatus is driven by a motor driving section 21, the motor driving section 21 is controlled by the control unit 100 indicated by a dashed-two dotted line, and the steering torque Th from the torque sensor 10 and the vehicle velocity Vel from a vehicle velocity detecting system are inputted into the control unit 100. In the motor 20, a motor inter-terminal voltage Vm and a motor current value i are measured and outputted.

The control unit 100 comprises a torque system control unit 110 indicated by a dashed line that performs a control by using the steering torque Th and a motor system control unit 120 indicated by a dashed-dotted line that performs a control relating to driving of the motor 20. The torque system control unit 110 comprises an assist amount calculating section 111, a differential control section 112, a yaw rate convergence control section 113, a robust stabilization compensating section 114 and an SAT (Self-Aligning Torque) estimation feedback section 115, addition sections 116A and 116B, and a subtraction section 116C. Further, the motor system control unit 120 comprises a compensating section 121, a disturbance estimating section 122, a motor angular velocity calculating section 123, a motor angular acceleration calculating section 124, a motor characteristic compensating section 125, and addition sections 126A and 126B.

The steering torque Th is inputted into the assist amount calculating section 111, the differential control section 112, the yaw rate convergence control section 113 and the SAT estimation feedback section 115, and all of them input the vehicle velocity Vel as a parameter. The assist amount calculating section 111 calculates an assist torque amount on the basis of the steering torque Th. The yaw rate convergence control section 113 inputs the steering torque Th and a motor angular velocity ω, and brakes a movement that the steering wheel whirls to improve the convergence of yaw of the vehicle. Further, the differential control section 112 enhances a control responsibility in the vicinity of a neutral point of the steering and realizes a smooth steering. Moreover, the SAT estimation feedback section 115 inputs the steering torque Th, a signal obtained in the addition section 116A by adding the output of the differential control section 112 to the output of the assist amount calculating section 111, the motor angular velocity ω calculated by the motor angular velocity calculating section 123 and a motor angular acceleration α from the motor angular acceleration calculating section 124 to estimate an SAT, performs signal processing by using a feedback filter with respect to the estimated SAT, and provides the steering wheel with suitable road information as a reaction force.

Further, a signal that is obtained in the addition section 116B by adding the output of the yaw rate convergence control section 113 to a signal obtained in the addition section 116A by adding the output of the differential control section 112 to the output of the assist amount calculating section 111, is inputted into the robust stabilization compensating section 114 as an assist amount AQ. For example, the robust stabilization compensating section 114 is a compensating section disclosed in Japanese Published Unexamined Patent Application No. H8-290778A, removes a peak value in a resonance frequency of a resonance system comprised of an inertia element and a spring element that are included in the detected torque, and compensates a phase shift of the resonance frequency that disturbs the responsibility and the stability of the control system. By subtracting the output of the SAT estimation feedback section 115 from the output of the robust stabilization compensating section 114 in the subtraction section 116C, an assist amount Ia capable of transmitting the road information to the steering wheel as the reaction force, is obtained.

Moreover, the motor angular velocity calculating section 123 calculates the motor angular velocity ω on the basis of the motor inter-terminal voltage Vm and the motor current value i, and the motor angular velocity ω is inputted into the motor angular acceleration calculating section 124, the yaw rate convergence control section 113 and the SAT estimation feedback section 115. The motor angular acceleration calculating section 124 calculates the motor angular acceleration α on the basis of the inputted motor angular velocity ω, and the calculated motor angular acceleration a is inputted into the motor characteristic compensating section 125 and the SAT estimation feedback section 115. In the addition sections 126A, the assist amount Ia obtained by subtracting the output of the SAT estimation feedback section 115 from the output of the robust stabilization compensating section 114, is added to the output Ic of the motor characteristic compensating section 125, and then this added signal is inputted into the compensating section 121 comprised of a differential compensating section or the like as a current command value Ir. A signal that is obtained by adding the output of the disturbance estimating section 122 in the addition section 126B to a current command value Ira obtained by compensating the current command value Ir by means of the compensating section 121, is inputted into the motor driving section 21 and the disturbance estimating section 122. The disturbance estimating section 122 is an apparatus disclosed in Japanese Published Unexamined Patent Application No. H8-310417 A, is capable of maintaining a desired motor control characteristic in an output reference of the control system on the basis of a signal obtained by adding the output of the disturbance estimating section 122 to the current command value Ira compensated by the compensating section 121 that is the control target of the motor output and the motor current value i, and does not lose the stability of the control system.

In such an electric power steering apparatus, recently, vehicles equipped with a parking support function (parking assist) that switch between the automatic steering control and the manual steering control appear. In a vehicle equipped with the parking support function, a target steering angle is set on the basis of data from a camera (image), a distance sensor or the like, and the automatic steering control which makes an actual steering angle follow up the target steering angle, is performed.

In an electric power steering apparatus having conventionally well-known functions of the automatic steering control (parking support mode) and the manual steering control, aback parking and a parallel parking are performed automatically by controlling an actuator (a motor) base on a pre-stored relation between a moving distance of the vehicle and a turning angle.

Then, a conventional steering control apparatus calculates a motor current command value so as to make an actual steering angle coincide with the target steering angle set dependent on the vehicle and realizes the automatic steering control. For example, in an automatic steering control device disclosed in Japanese Patent No.3917008 B2 (Patent Document 1), in a steering angle control, a velocity PI (proportional and integral) control is performed with respect to a deviation between a target steering angle and a steering angle (an actual steering angle), and that arithmetic result is used in a steering angle follow-up control.

THE LIST OF PRIOR ART DOCUMENTS

Patent Documents

Patent Document 1: Japanese Patent No.3917008 B2
Patent Document 2: Japanese Patent No.5068327 B2

SUMMARY OF THE INVENTION

Problems to be Solved by the Invention

However, in conventional automatic steering control, in the case of performing the steering angle control in the vehicle, since disturbances and load status largely vary due to a running vehicle velocity, changes in frictions and a road surface reaction force and so on, the steering angle control must be a control configuration having resistance properties against these. However, in the velocity PI-control, for example, in the case that the road surface reaction force changes, since the response of the actual steering angle changes due to the change in the road surface reaction force, there is a possibility that the actual steering angle is unable to follow up the target steering angle with a high accuracy and the vehicle deviates from the target steering angle. Further, also in the case that the target steering angle changes at a high speed, although the actual steering angle is controlled by motor assist so as to follow up the target steering angle, in the device of Patent Document 1, since a spring-inertial system of the steering wheel is not considered, in this case, there is a possibility that vibrations occur due to the spring-inertial system of the steering wheel and a driver feels that as an uncomfortable feeling.

Further, in the electric power steering apparatus, in order to detect the steering torque of the driver, a torsion bar is arranged at the column shaft, the steering torque of the driver is detected by the torque sensor utilizing an operation that a torsion angle is proportional to a torque being applied to the torsion bar, and the assist control is performed. However, vibrations caused by a spring mass system of the torsion bar and the steering wheel sometimes occur during the automatic steering control which makes the actual steering angle follow up the target steering angle.

As techniques for suppressing a motor assist change during the automatic steering control, for example, there is a steering control device disclosed in Japanese Patent No.5068327 B2 (Patent Document 2). In the device of Patent Document 2, a motor assist control is performed by the sum of respective command values of the automatic steering control and the assist control, and the correction is performed by an inertial torque change obtained by extracting changes caused by an inertial torque from the torque so as to enable the driver to easily perform the steering operation during the automatic steering control.

However, in the steering control device of Patent Document 2, since the inertial torque is extracted by a low pass filter (LPF) and the assist torque uses phases after the occurrence of the inertial torque, a delay occurs.

During the automatic steering control of the electric power steering apparatus that performs the automatic steering which makes the actual steering angle follow up the target steering angle, in the case of determining that the driver steered the steering wheel, it is preferred to terminate the automatic control and smoothly switch to the assist control of the manual steering control without giving the uncomfortable feeling to the driver.

The present invention has been developed in view of the above-described circumstances, and the first object of the present invention is to provide an electric power steering apparatus that realizes vibration suppression of response characteristics and has a control performance having resistance properties against the disturbances such as the frictions and the road surface change by using a velocity I-P control (a proportional-lead type PI-control) in a vehicle having functions of the automatic steering control and the manual steering control. Further, the second object of the present invention is to provide a high-performance electric power steering apparatus that is capable of adjusting a resonance frequency and a damping ratio by the control so as not to give the uncomfortable feeling to the driver by calculating a compensation value from the steering torque and a torque differential by another means different from the ordinary assist control and adding the calculated compensation value to the current command value to drive the motor.

Means for Solving the Problems

The present invention relates to an electric power steering apparatus that calculates a first motor current command value on the basis of a steering torque and a vehicle velocity, performs an assist control of a steering system by driving a motor on the basis of said first motor current command value, and has a function for switching between an automatic steering control and a manual steering control, the above-described object of the present invention is achieved by that comprising: a steering angle control section that calculates a second motor current command value in said automatic steering control so as to bring an actual steering angle close to a target steering angle; and a switching section that inputs said first motor current command value and said second motor current command value and switches between said first motor current command value and said second motor current command value depending on a switching signal, wherein said steering angle control section comprises a rate limiter that performs smoothing with respect to said target steering angle, and outputs as said second motor current command value on the basis of a first deviation between an output of said rate limiter and said actual steering angle and a motor angular velocity.

Further, the above-described object of the present invention is achieved by that comprising: a steering angle control section that calculates a second motor current command value on the basis of said steering torque, a target steering angle, an actual steering angle and a motor angular velocity of said motor; and a switching section that inputs said first motor current command value and said second motor current command value to switch, wherein said steering angle control section comprises a position control section that outputs a motor velocity command depending on a deviation angle between said target steering angle and said actual steering angle; a velocity control section that inputs said motor velocity command and said motor angular velocity to perform a velocity control; a steering wheel damping control section that inputs said steering torque to perform a steering wheel damping control; and an output section that processes a third motor current command value from said velocity control section and a fourth motor current command value from said steering wheel damping control section to output said second motor current command value, wherein said switching section is switched depending on a switching command of said automatic steering control and said manual steering control, said motor is drive-controlled on the basis of said second motor current command value in said automatic steering control.

Effects of the Invention

According to an electric power steering apparatus of the present invention, since the automatic steering control is performed by using the velocity I-P control (the proportional-lead type PI-control) in a vehicle having functions of the automatic steering control (the parking support function) and the manual steering control, it is possible to realize the vibration suppression of the response characteristics and realize the control performance having the resistance properties against the disturbances such as the road surface change and suppressing dispersion in manufacturing. Further, according to the present invention, since the spring-inertial vibration component of the steering wheel system is removed from the change in the target steering angle not only by the vibration suppression performance of the I-P control but also by a rate limiter and an LPF (Low Pass Filter), it is possible to realize smoother behavior.

Further, it is possible to further improve the responsibility of the steering angle by adding a feedforward system.

Furthermore, according to the electric power steering apparatus of the present invention, since the steering angle control is performed by a steering angle command value to become driving with the driver's hands free during the automatic steering control, a torque control on the basis of a steering wheel torque is not performed. By detecting a torque value generated by the inertia of the steering wheel during the automatic steering control and adding the detected torque value to the steering angle command value as the compensation value, it is possible to suppress the steering wheel vibration. That is, since the present invention provides a steering wheel damping control section, performs an addition processing of velocity components that are calculated by a proportional section and a differential gain section and corrects the motor current command value with the addition result, it is possible to realize the steering wheel damping with a high responsibility and without a phase delay.

MODE FOR CARRYING OUT THE INVENTION

In the present invention, an electric power steering apparatus of a vehicle having functions of the automatic steering control and the manual steering control, performs the automatic steering control which makes the actual steering angle follow up the target steering angle with a high accuracy and without using any particular parts. That is to say, the present invention realizes the vibration suppression of the response characteristics and has a control configuration having the resistance properties against the disturbances such as the frictions and the road surface change by using the velocity I-P control (the proportional-lead type PI-control).

Further, the present invention achieves smoother behavior by removing the spring-inertial vibration component of the steering wheel (handle) system from the change in the target steering angle not only by the vibration suppression performance of the I-P control but also by a rate limiter for preventing that the current command value changes rapidly and a filter for reducing the steering wheel vibration. Moreover, it is possible to further improve the responsibility of the steering angle by adding a feedforward system to the velocity I-P control.

Hereinafter, embodiments of the present invention will be described in detail with reference to the accompanying drawings.

Figure 1:
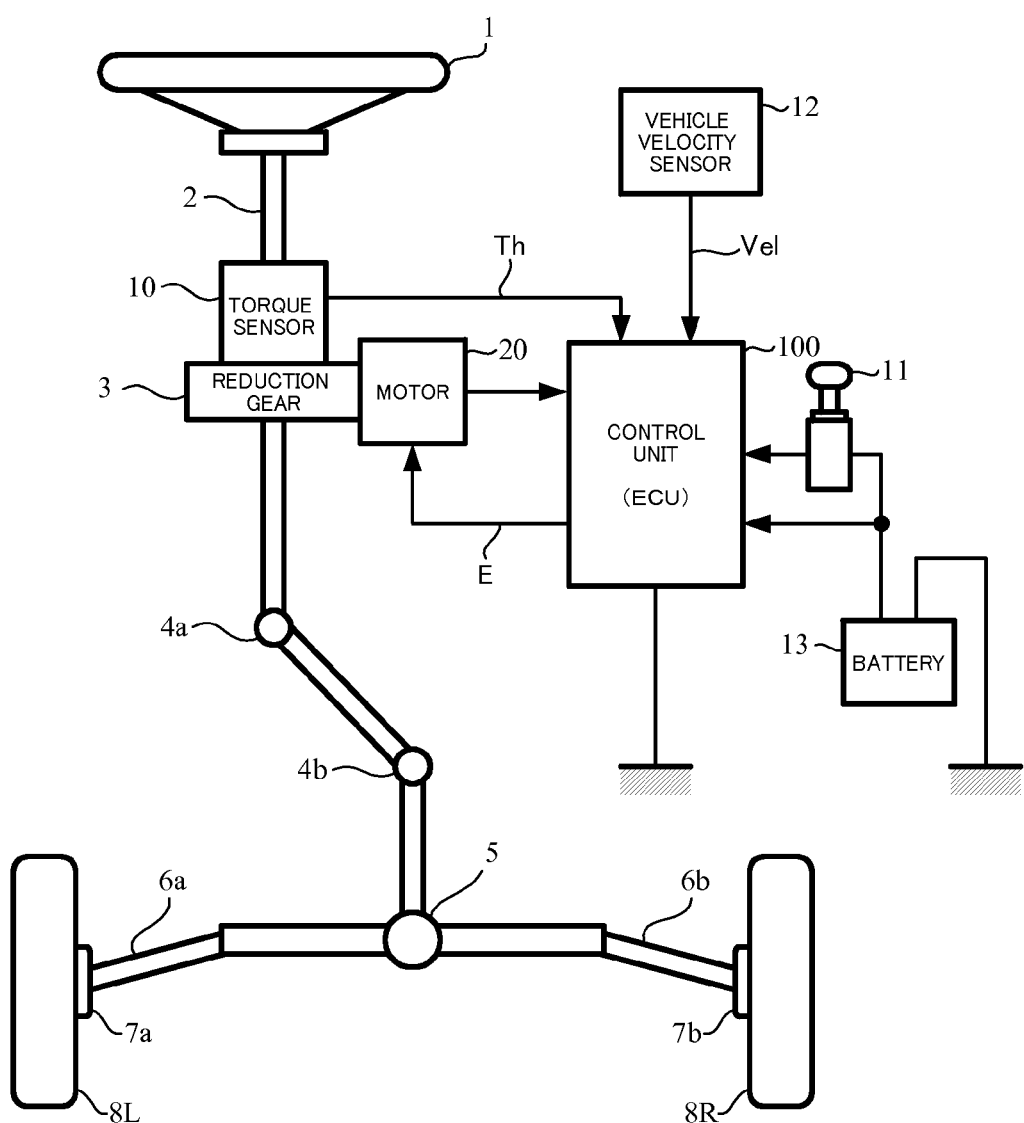
FIG. 1 is a configuration diagram illustrating a general outline of an electric power steering apparatus.
Figure 2:
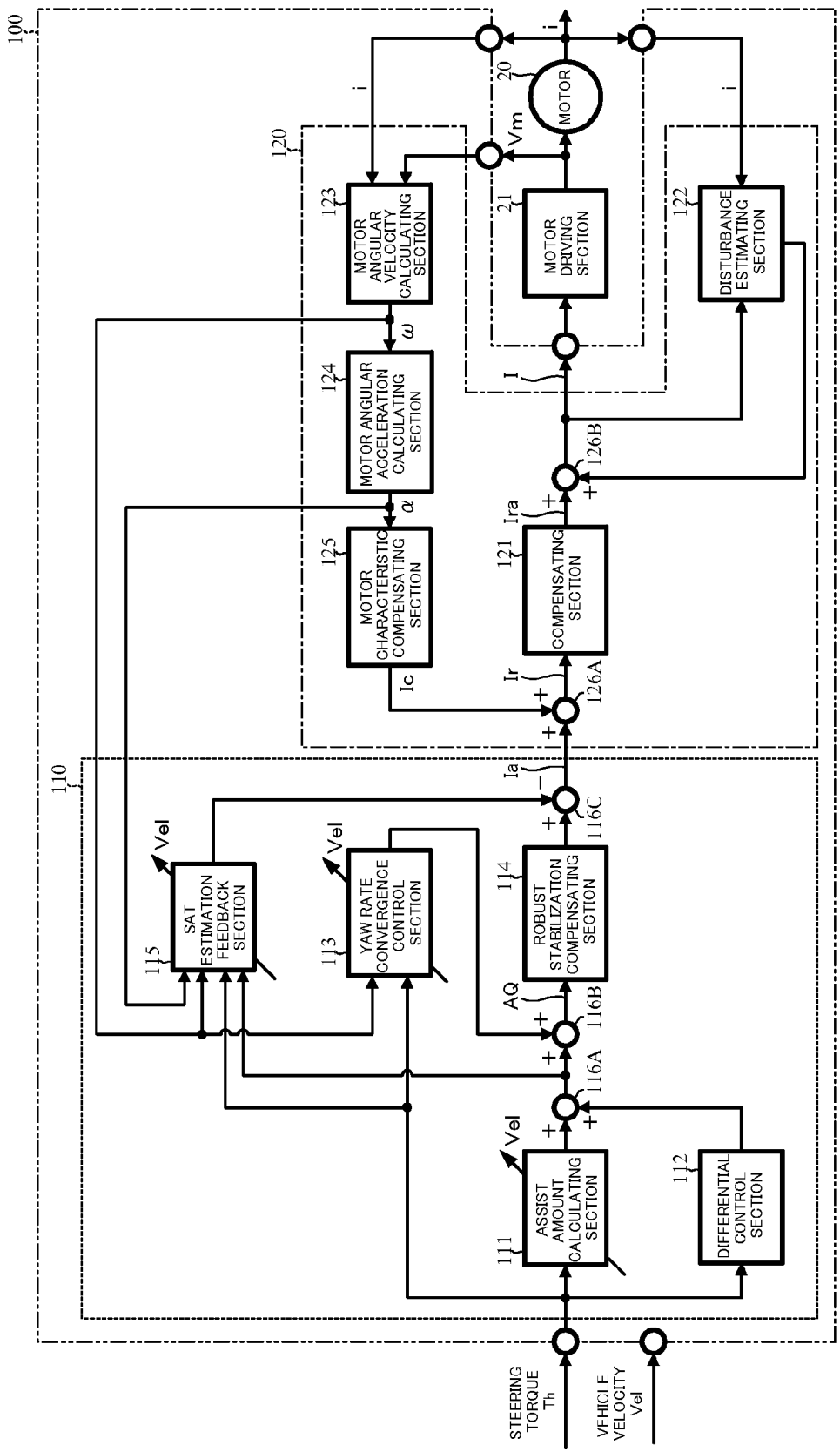
FIG. 2 is a block diagram showing a configuration example of a control system of a conventional electric power steering apparatus.
Figure 3:
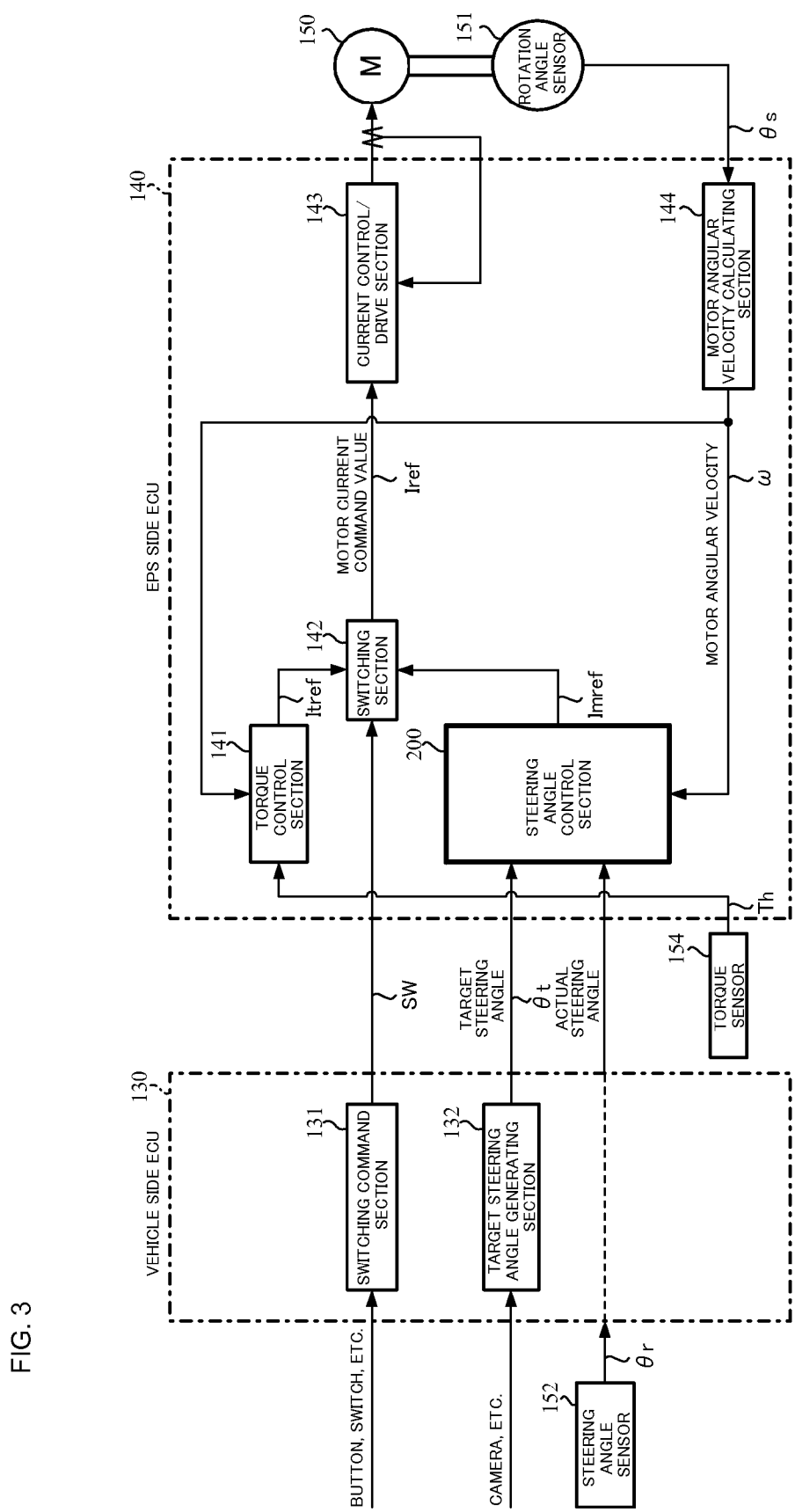
FIG. 3 is a block diagram showing a configuration example (the first embodiment) of the present invention.

FIG. 3 is a block diagram showing a configuration example (the first embodiment) of the present invention. As shown in FIG. 3, a rotation angle sensor 151 for detecting a motor rotation angle θs such as a resolver is connected to a motor 150, and the motor 150 is drive-controlled via a vehicle side ECU 130 and an EPS (Electric Power Steering apparatus) side ECU 140.

The vehicle side ECU 130 comprises a switching command section 131 that outputs a switching command SW of the automatic steering control or the manual steering control on the basis of a button, a switch or the like indicating the intention of a driver and a target steering angle generating section 132 that generates a target steering angle θt on the basis of a signal from a camera (image), a distance sensor or the like. Further, an actual steering angle θr detected by a steering angle sensor 152 provided on the column shaft (the handle shaft), is inputted into a steering angle control section 200 within the EPS side ECU 140 through the vehicle side ECU 130. The steering angle sensor 152 may be a steering angle estimation value on the basis of the column shaft (including an intermediate shaft, a pinion shaft), the displacement of rack of the rack and pinion or a wheel velocity.

The switching command section 131 outputs the switching command SW on the basis of a signal that identifies entering the automatic steering control, for example, on the basis of the button or the switch indicating the intention of the driver that is provided on a dashboard or on the periphery of the steering wheel, or a vehicle state signal represented by a parking mode or the like provided on the shift, and then the switching command SW is inputted into a switching section 142 within the EPS side ECU 140. Further, the target steering angle generating section 132 generates the target steering angle θt on the basis of data from the camera (image), the distance sensor or the like by means of a publicly-known method, and inputs the generated target steering angle θt into the steering angle control section 200 within the EPS side ECU 140.

The EPS side ECU 140 comprises a torque control section 141 that outputs a motor current command value Itref calculated on the basis of a steering torque Th from a torque sensor 154 of a torsion bar and a motor angular velocity ω, the steering angle control section 200 that calculates a motor current command value Imref for performing the automatic steering control on the basis of the target steering angle θt, the actual steering angle θr and the motor angular velocity ω and outputs the calculated motor current command value Imref, the switching section 142 that switches between the motor current command values Itref and Imref depending on the switching command SW from the switching command section 131 and outputs a motor current command values Iref, a current control/drive section 143 that drive-controls the motor 150 on the basis of the motor current command value Iref (Itref or Imref) from the switching section 142, and a motor angular velocity calculating section 144 that calculates the motor angular velocity ω on the basis of the motor rotation angle θs from the rotation angle sensor 151.

The switching section 142 switches between a torque control mode (the manual steering control) by the torque control section 141 and the automatic steering control by the steering angle control section 200 on the basis of the switching command SW from the switching command section 131 of the vehicle side ECU 130, in the manual steering control, outputs the motor current command value Itref as the motor current command value Iref, and in the automatic steering control, outputs the motor current command value Imref as the motor current command value Iref. Further, the current control/drive section 143 comprises a PI current control section, a PWM control section, an inverter and so on.

Figure 4:
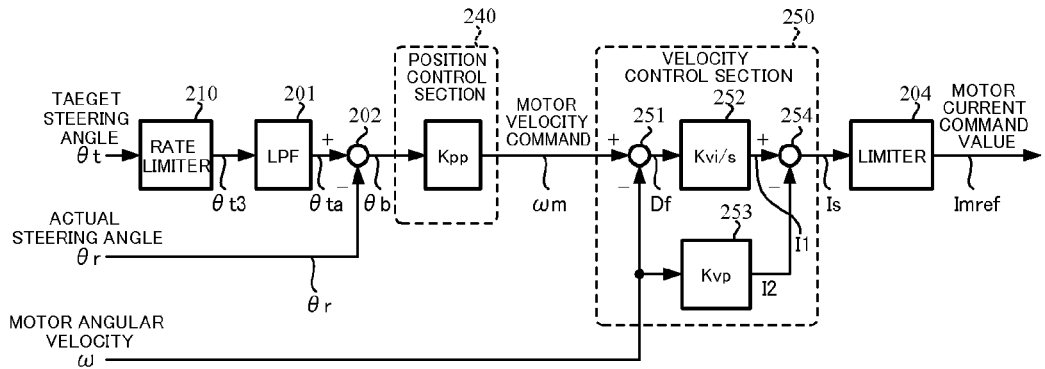
FIG. 4 is a block diagram showing one configuration example of a steering angle control section.

The steering angle control section 200 has a configuration shown in FIG. 4. As shown in FIG. 4, the target steering angle θt is inputted into a rate limiter 210 that performs a smoothing when the target steering angle θt changes rapidly, that is, makes the target steering angle θt change smoothly within the range of a predetermined time change rate, and a target steering angle θta passed through an LPF 201 for removing high-frequency disturbances is addition-inputted into a subtraction section 202. The rate limiter 210 performs a rate limit processing with respect to the target steering angle θt and also contributes to improving safety of the driver. Further, although vibrations caused by spring characteristics of the torsion bar and an inertia moment of the steering wheel occur during the automatic steering, the LPF 201 reduces vibration frequency components included in the steering angle command value after the rate limit processing.

The actual steering angle θr is subtraction-inputted into the subtraction section 202, an angle deviation θb between the actual steering angle θr and the target steering angle θta that the smoothing and the high-frequency removing are performed is obtained in the subtraction section 202, the angle deviation θb is multiplied by a gain Kpp in a position control section 240 and then addition-inputted into a subtraction section 251 within a velocity control (velocity I-P control) section 250 as a motor velocity command value ωm. The motor angular velocity ω from the motor angular velocity calculating section 144 is subtraction-inputted into the subtraction section 251, the calculated velocity deviation Df is multiplied by a gain Kv and integrated in an integral section 252 and then addition-inputted into a subtraction section 254. Further, the motor angular velocity ω is inputted into a proportional section 253 within the velocity control section 250, the motor angular velocity multiplied by a gain Kvp is subtraction-inputted into the subtraction section 254, and a deviation being a subtraction result of the subtraction section 254 is inputted into a limiter 204 as a motor current command value Is. The motor current command value Is that the upper and lower limit values are limited by the limiter 204 is outputted as the motor current command value Imref.

In addition, a current command value calculating section comprises the position control section 240 and the velocity control section 250.

Figure 5:
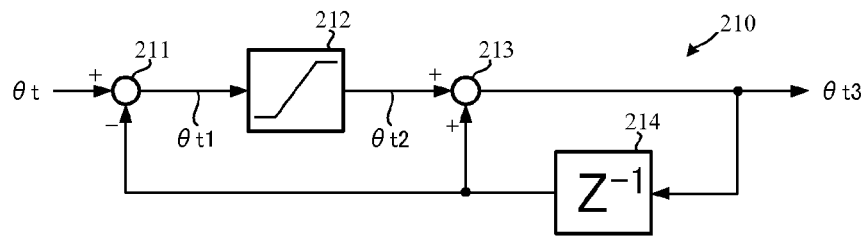
FIG. 5 is a block diagram showing a configuration example of a rate limiter.
Figure 6:
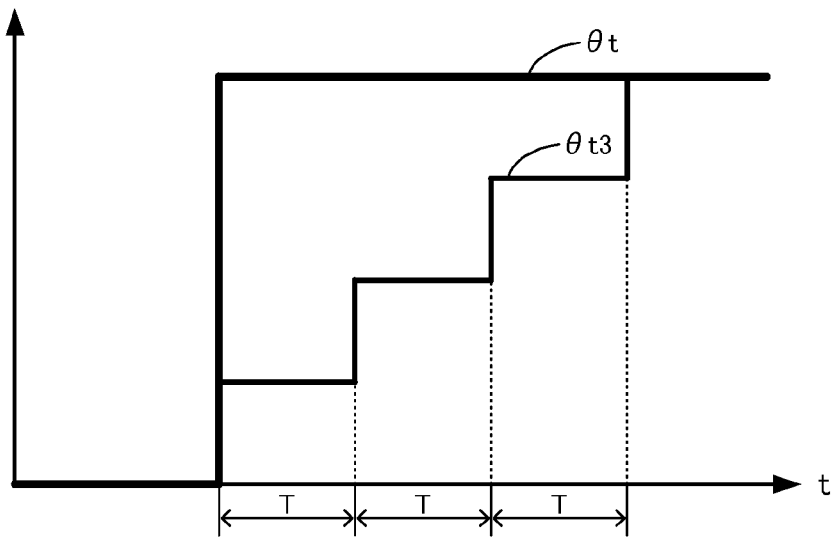
FIG. 6 is a characteristic diagram showing an operation example of the rate limiter.

The rate limiter 210 performs a smoothing with respect to the target steering angle θt and outputs the smoothed the target steering angle θt when the target steering angle θt changes rapidly, for example, has a configuration shown in FIG. 5. As shown in FIG. 5, the target steering angle θt is addition-inputted into a subtraction section 211, depending on a steering angle θt1 being the subtraction result obtained by subtracting a past value from the target steering angle θt, a variation amount setting section 212 sets a variation amount θt2. The variation amount setting section 212 sets a difference θt1 between the past value from a holding section ($Z^{-1}$) 214 and the input (et), and the addition result obtained by adding the past value to the variation amount θt2 in an addition section 213 is outputted as a new target steering angle θt3. The variation amount setting section 212 makes the variation amount not exceeding an upper limit and a lower limit that are set, that characteristic obtains the difference with the input (target steering angle) θt at each of calculation periods T, in the case of falling outside the upper limit and the lower limit of the variation amount setting section 212, by repeatedly performing adding the difference to the past value, the output θt3 varies in a staircase pattern shown in FIG. 6 and finally matching the output θt3 with the target steering angle θt.

Further, in the case that the difference with the input (the target steering angle) θt is within the range of the upper limit and the lower limit of the variation amount setting section 212, since the variation amount θt2 (=the difference θt1) is outputted and added to the past value, the result output θt3 coincides with the input (the target steering angle) θt. As these results, even if the target steering angle θt changes rapidly, it is possible to smoothly vary the target steering angle θt changing rapidly, a rapid current variation (i.e. a rapid steering) is prevented, and a function that reduces an uneasy feeling relating to the automatic operation of the driver is fulfilled.

Figure 7:
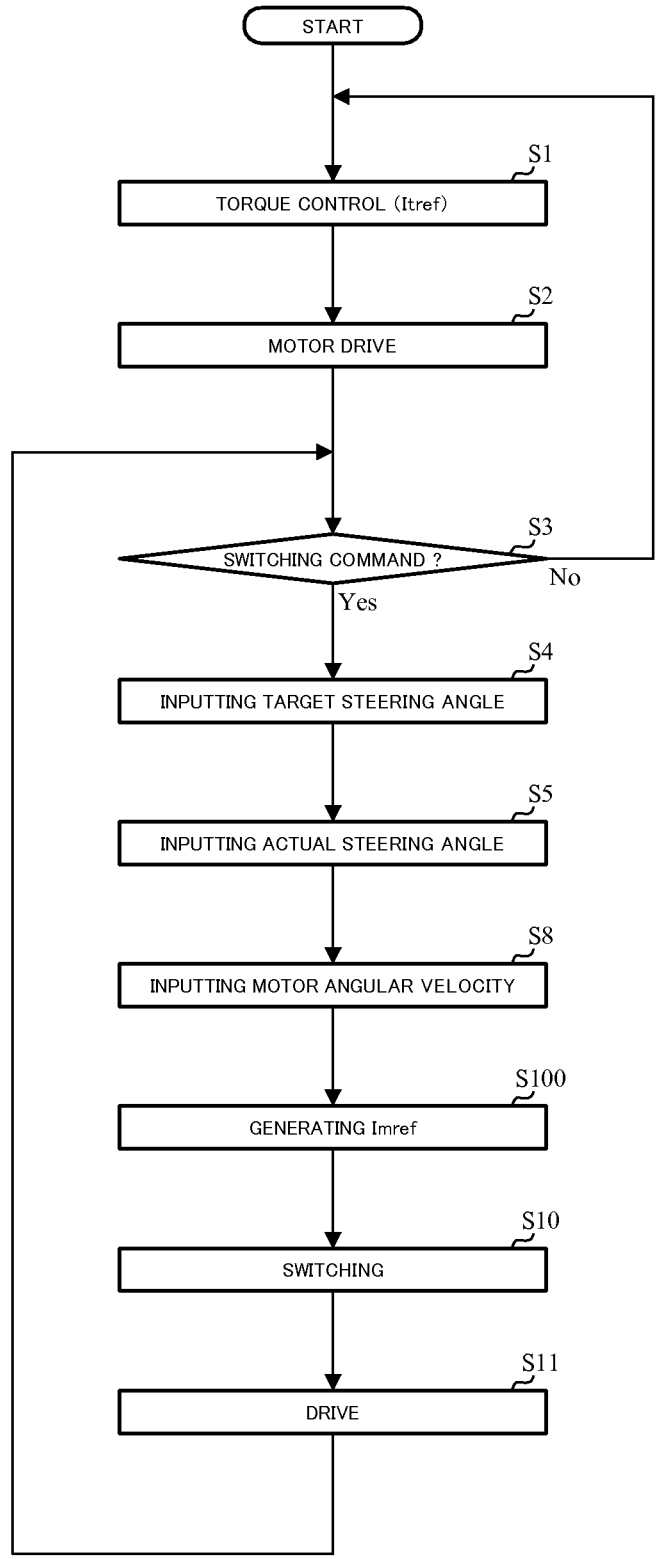
FIG. 7 is a flowchart showing an operation example of the present invention.

In such a configuration, an entire operation example of the present invention will be described with reference to a flowchart shown in FIG. 7.

When the operation of the steering system starts, the torque control (the manual steering mode) by the torque control section 141 is carried out (Step S1), and the motor 150 is driven by using the motor current command value Itref and by means of the current control/drive section 143 (Step S2). The above operations are repeatedly performed until the switching command SW is outputted from the switching command section 131 (Step S3).

When becoming the automatic steering control and then the switching command SW is outputted from the switching command section 131, the target steering angle θt is inputted into the steering angle control section 200 from the target steering angle generating section 132 (Step S4), the actual steering angle θr is inputted into the steering angle control section 200 from the steering angle sensor 152 (Step S5), the motor angular velocity ω is inputted into the steering angle control section 200 from the motor angular velocity calculating section 144 (Step S8), and the motor current command value Imref is generated by the steering angle control section 200 (Step S100). Moreover, the target steering angle θt, the actual steering angle θr and the motor angular velocity ω can be inputted in an arbitrary order.

Thereafter, the switching section 142 is switched to the automatic steering control by the switching command SW from the switching command section 131 (Step S10), and the motor 150 is driven by using the motor current command value Imref from the steering angle control section 200 and by means of the current control/drive section 143 (Step S11).

Figure 8:
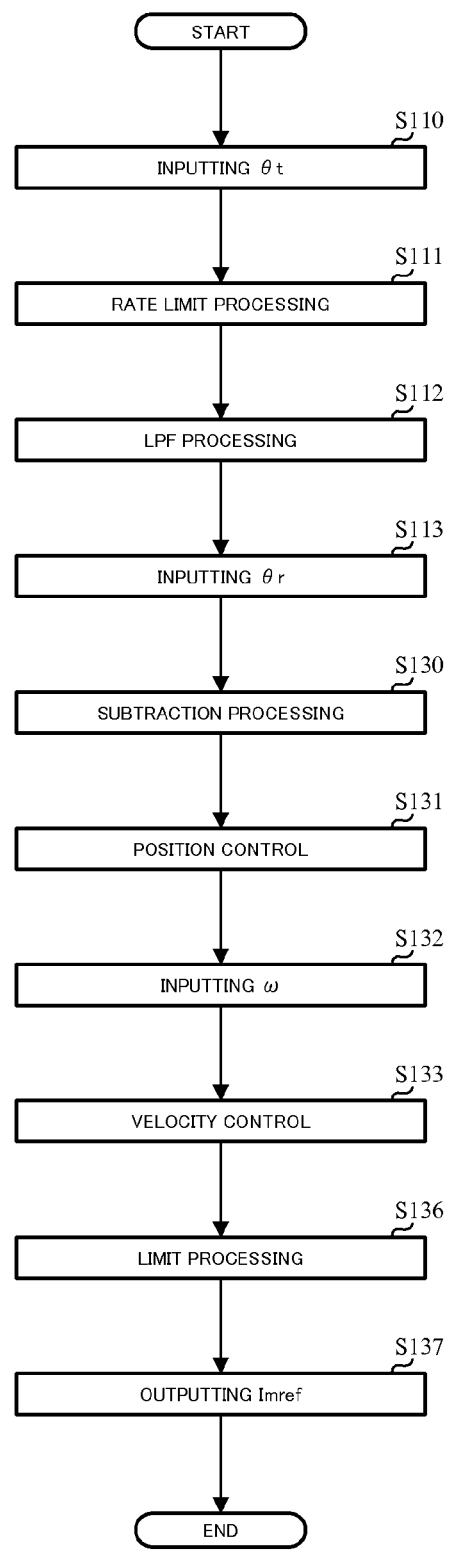
FIG. 8 is a flowchart showing an operation example of the steering angle control section.

Operations of the automatic steering control like this will be described in detail with reference to a flowchart shown in FIG. 8.

At first, the rate limiter 210 inputs the target steering angle θt (Step S110) and performs the rate limiting processing described as above that makes the rapid variation smooth with respect to the target steering angle θt (Step S111), in order to remove the steering wheel vibration, an LPF processing (the high-frequency removing) is performed by the LPF with respect to the target steering angle θt3 that the rate limiting processing is performed, and the target steering angle θta is outputted (Step S112). Next, the actual steering angle θr is inputted (Step S113), the subtraction section 202 subtracts the actual steering angle θr from the target steering angle θta (Step S130), the deviation θb (=θta−θra) being the subtraction result is inputted into the position control section 240 to perform a position control, and the motor velocity command value ωm obtained by the position control is inputted into the subtraction section 251 within the velocity control section 250 (Step S131). Furthermore, the motor angular velocity ω is inputted into the subtraction section 251 and the proportional section 253 (Step S132), and the velocity control section 250 performs the velocity I-P control and outputs the deviation obtained in the subtraction section 254 as the motor current command value Is (Step S133). A limit processing is performed by the limiter 204 with respect to the motor current command value Is (Step S136), and the motor current command value Imref that the upper and lower limit values are limited is outputted (Step S137).

Figure 9:
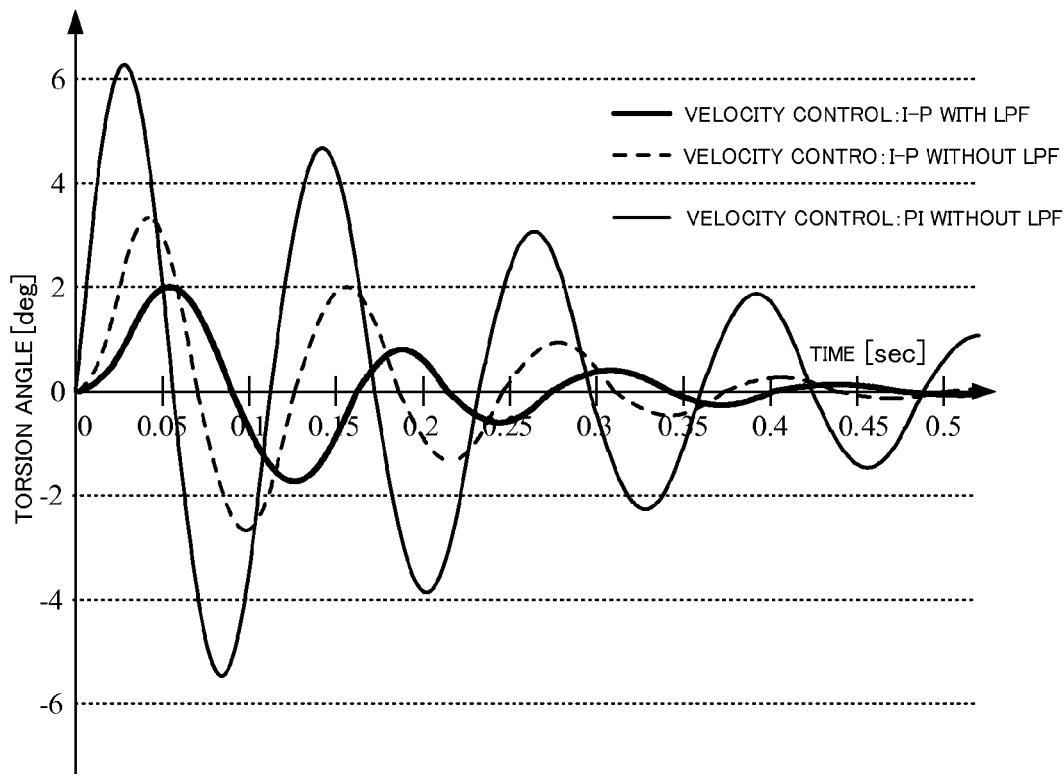
FIG. 9 is a characteristic diagram showing characteristics (the velocity I-P control) of the present invention by comparison with other embodiment.

FIG. 9 shows time response examples of the torsion angle of the torsion bar in the case that the target steering angle changes from 0° to 90° in a stepwise manner and the PI control (thin line) or I-P control (thick line, dashed line) is used in the velocity control. In FIG. 9, P-gains and I-gains of the PI control and the I-P control are set to the same, respectively. From this result, it is clear that the torsion angle in the case of the I-P control is smaller than that in the case of the PI control. Further, in the I-P control, by comparison with the result of interposing the LPF with respect to the target steering angle, it is clear that the amplitude in the case of the presence of the LPF is smaller than that in the case of the absence of the LPF. That is to say, in the velocity control, the I-P control is better than the PI control, furthermore, in the case of the I-P control with interposing the LPF with respect to the target steering angle, the vibrations are hardest to occur.

Figure 10:
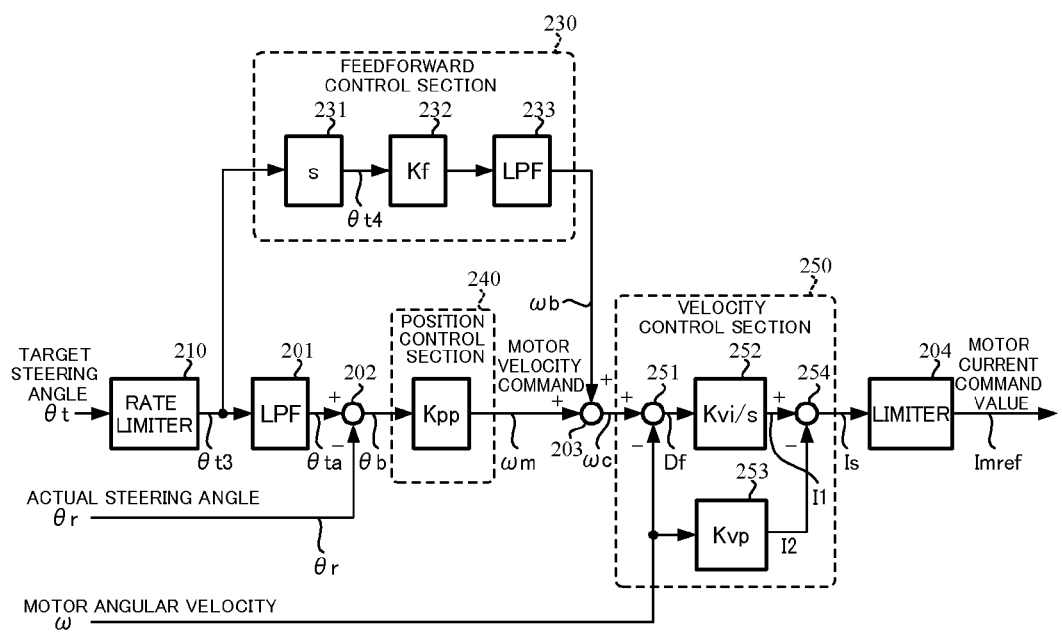
FIG. 10 is a block diagram showing another configuration example of the steering angle control section.

FIG. 10 shows another configuration example of the steering angle control section 200 that further adds a feedforward control section 230 and an addition section 203 to the configuration of FIG. 4. As shown in FIG. 10, the feedforward control section 230 comprised of a differential section 231 that differentiates the target steering angle θt3 processed by the rate limiter 210, a gain section 232 that gives a gain Kf to a differentiated target steering angle (velocity command value) θt4 and an LPF 233 that removes high-frequency components of a motor velocity command value multiplied by the gain Kf is provided, the addition section 203 adds a motor velocity command value ωb outputted from the LPF 233 to the motor velocity command value ωm, and a motor velocity command value ωc obtained by the addition of the addition section 203 is inputted into the velocity control section 250. Since the velocity component obtained by differentiating the target steering angle θt3 by the differential section 231 is added to the velocity command value, it is possible to improve the responsibility of the steering angle with respect to the target steering angle θt.

In addition, although the gain section 232 is provided at a post-stage of the differential section 231 as mentioned above, the gain section 232 may be provided at a pre-stage of the differential section 231.

Figure 11:
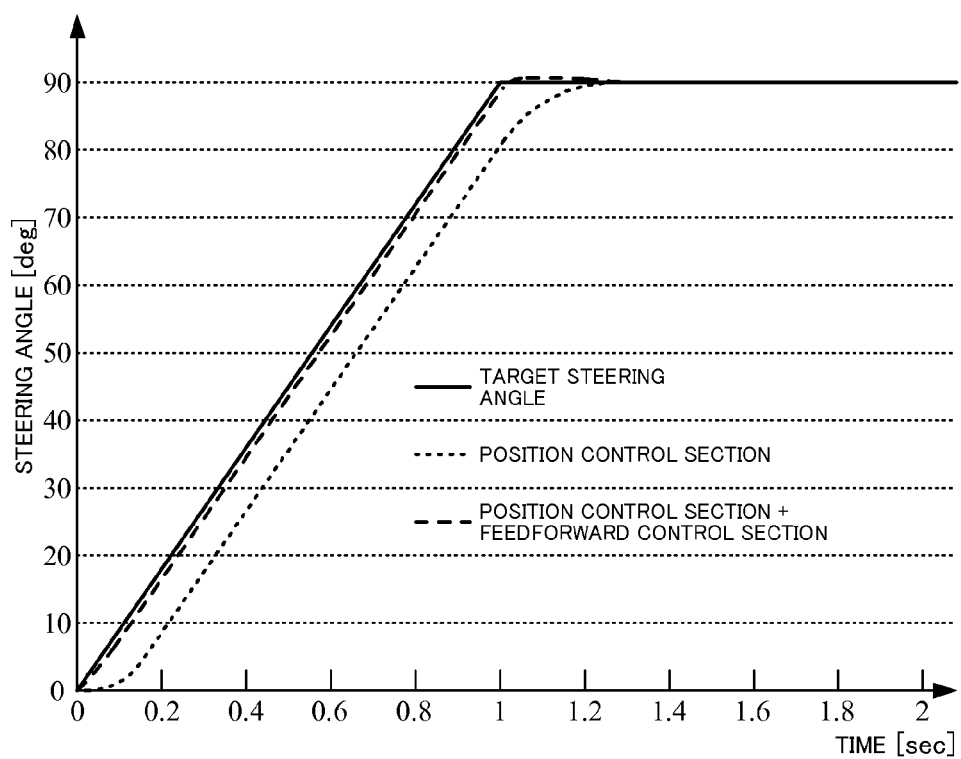
FIG. 11 is a characteristic diagram showing the characteristic (a feedforward control is added) of the present invention (the first embodiment) by comparison with other embodiments.

FIG. 11 shows time response examples of the actual steering angle with respect to the target steering angle in the case of the presence of the feedforward control section 230 and in the case of the absence of the feedforward control section 230. From this result, it is clear that the actual steering angle (thin dashed line, thick dashed line) follows up the target steering angle (solid line) in the case of adding the feedforward control section 230. The time response of the feedforward control section 230 is indicated by a thick dashed line and almost follows up the target steering angle (solid line).

Although the steering angle control of the steering wheel is performed during the automatic steering control such as parking support, automatic running or the like, since the steering angle control is performed by the steering angle command value to become driving with the driver's hands free during the automatic steering control, the torque control on the basis of the steering wheel torque is not performed. By detecting the torque value generated by the inertia of the steering wheel system during the automatic steering control and adding the detected torque value to the steering angle command value as the compensation value, it is possible to suppress the steering wheel vibration.

Motion equations that hold among a steering inertia, a torsion bar lower (the motor, the column shaft and son on) inertia and the torsion bar become the following Expression 1. Where a load torque applied to the steering during the automatic steering control is set to "0".

$$J_h \ddot{\theta}_h = -C_t(\dot{\theta}_h - \dot{\theta}) - K_t(\theta_h - \theta)$$

$$J\ddot{\theta} = C_t(\dot{\theta}_h - \dot{\theta}) + K_t(\theta_h - \theta) + T \qquad \text{[Expression 1]}$$

where, J is a lower inertia of the torsion bar, Jh is a steering inertia moment, Ct is a viscosity coefficient of the torsion bar, Kt is a spring constant of the torsion bar, θh is a steering wheel angle (the steering angle), θ is a torsion bar lower angle, and T is a drive torque.

A transfer function of a torsion angle Δθ(=θ−θh) with respect to the drive torque T becomes the following Expression 2.

$$\frac{\Delta\theta}{T} = \frac{1}{J\omega_z^2} \frac{\omega_a^2}{s^2 + 2\zeta_a\omega_a s + \omega_a^2} \qquad \text{[Expression 2]}$$

where a resonance frequency ωa, an anti-resonance frequency ωz and a damping ratio ξa are represented by the following Expression 3.

$$\omega_a = \sqrt{K_t\left(\frac{1}{J} + \frac{1}{J_h}\right)} \qquad \text{[Expression 3]}$$

$$\omega_z = \frac{\omega_a}{\sqrt{1 + \frac{J_h}{J}}}$$

$$\zeta_a = \frac{C_t\left(1 + \frac{J_h}{J}\right)}{2\omega_a J_h}$$

The torsion angle Δθ responds to the drive torque T with the resonance frequency ωa and the damping ratio ξa during the automatic steering control. Since these characteristics are determined depending on design values, in the case that the damping ratio ξa is small, since the torsion angle Δθ causes vibrations with bad convergence, a vibration continuation time of the steering becomes long during the automatic steering control, and this becomes an unfavorable behavior to the driver.

Since the steering torque T detected by the torque sensor is proportional to the torsion angle Δθ of the torsion bar, when components of a proportional compensation and a differential compensation of the detected steering torque T are fed back to the drive torque, the following Expression 4 holds.

$$T = T' + T_c = T' - (K_p\Delta\theta + K_d\dot{\Delta\theta}) \qquad \text{[Equation 4]}$$

The drive torque T' including a compensation torque is represented by the above Expression 4, and a transfer function of the torsion angle Δθ with respect to the drive torque T' becomes the following Expression 5.

$$\frac{\Delta\theta}{T'} = \frac{1}{J\omega_z^2} \frac{\omega_a^2}{s^2 + \omega_a\left(2\zeta_a + \frac{K_d}{J\omega_z^2}\right)s + \omega_a^2\left(1 + \frac{K_p}{J\omega_z^2}\right)} \qquad \text{[Expression 5]}$$

From the above Expression 5, a resonance frequency ωa' and a damping ratio ξa' of a system including the compensation torque are represented by the following Expression 6.

$$\omega_a' = \omega_a\sqrt{1 + \frac{K_p}{J\omega_z^2}} \qquad \text{[Expression 6]}$$

$$\zeta_a' = \zeta_a + \frac{K_d}{2J\omega_z^2}$$

It is clear from the resonance frequency ωa' and the damping ratio ξa' that applying the compensation torque by a proportional compensation gain Kp and a differential compensation gain Kd is equivalent to adjusting the damping ratio and the resonance frequency. Therefore, by adding signals of the torque and the torque differential to the automatic steering control as a compensation system, it becomes possible to adjust the resonance frequency and the damping ratio in preferable vibrations to the driver without adjusting mechanical characteristics.

Figure 12:
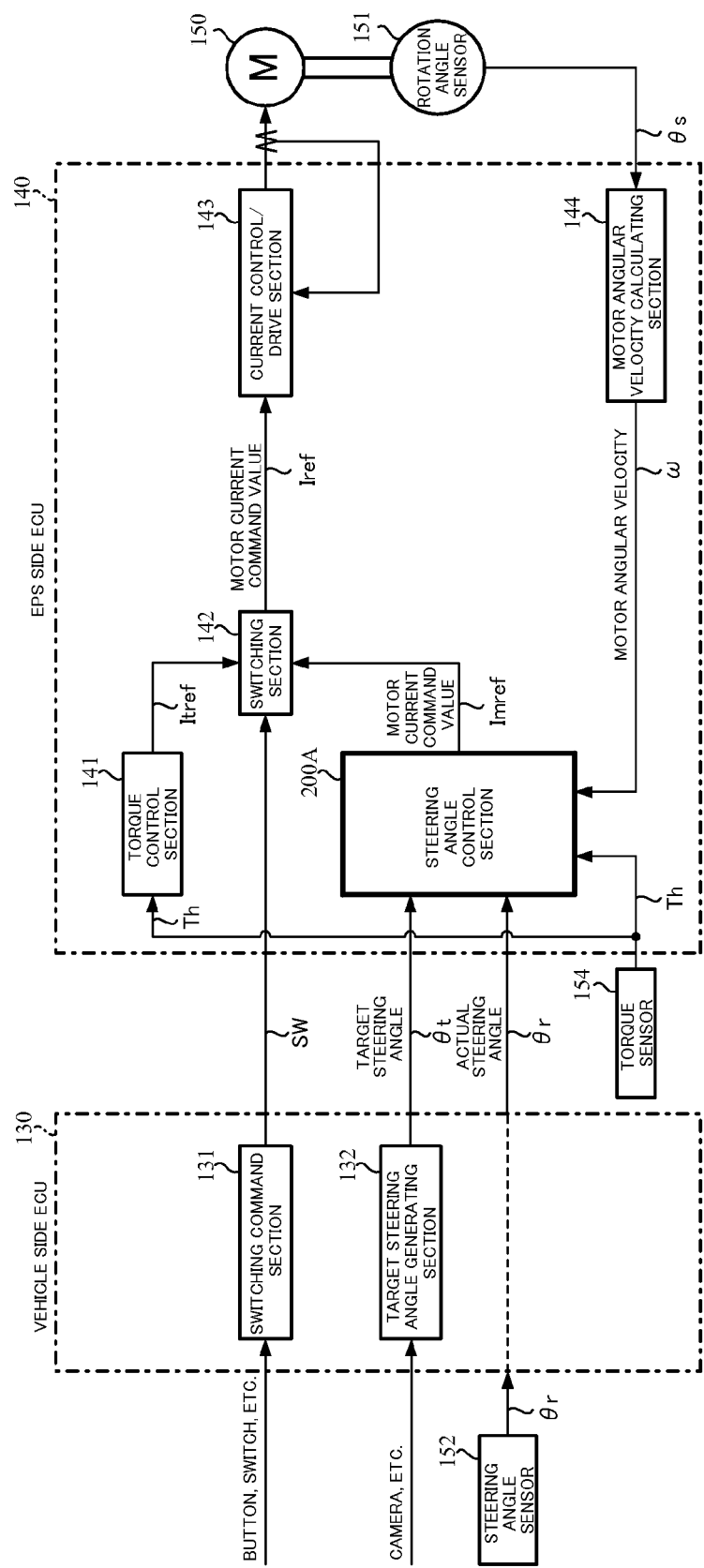
FIG. 12 is a block diagram showing a configuration example (the second embodiment) of the present invention.

FIG. 12 shows a configuration example (the second embodiment) of the present invention by corresponding to FIG. 3 of the first embodiment. As shown in FIG. 12, only a steering angle control section 200A within the EPS side ECU 140 is different, and the steering torque Th from the torque sensor 154 is inputted into the steering angle control section 200A.

Figure 13:
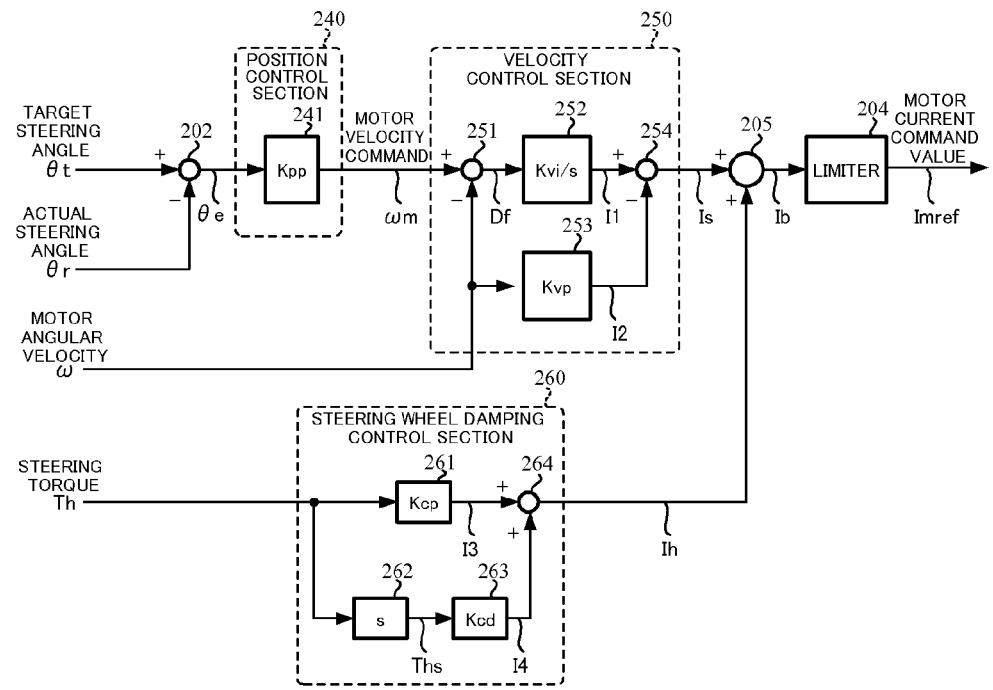
FIG. 13 is a block diagram showing a configuration example of the steering angle control section.

The steering angle control section 200A has a configuration shown in FIG. 13 by corresponding to FIG. 4. As shown in FIG. 13, a deviation angle θe between the target steering angle θt and the actual steering angle θr is obtained by the subtraction section 202, the deviation angle θe is inputted into the position control section 240, multiplied by the gain Kpp in a gain section 241 and addition-inputted into the subtraction section 251 within the velocity control section 250 as the motor velocity command value ωm. The motor angular velocity ω from the motor angular velocity calculating section 144 is subtraction-inputted into the subtraction section 251, and the calculated velocity deviation Df is multiplied by a gain Kvi and integrated in the proportional integral section 252 and then addition-inputted into the subtraction section 254. Further, the motor angular velocity ω is inputted into a gain section 253 within the velocity control 250, multiplied by the gain Kvp and subtraction-inputted into the subtraction section 254. The subtraction result of the subtraction section 254 is outputted from the velocity control 250 as the motor current command value Is (a third motor current command value described in the claim) and inputted into an addition section 205.

Further, the steering torque Th from the torque sensor 154 is inputted into the torque control section 141 and inputted into a steering wheel damping control section 260 within the steering angle control section 200A to be proportional-differential-controlled, a motor current command value Ih (a fourth motor current command value described in the claim) corrected by proportional-differential is inputted into the addition section 205 and added to the motor current command value Is from the velocity control 250, and a motor current command value Ib being the addition result of the addition section 205 is limited by the upper and lower limit values in the limiter 204 and outputted as the motor current command value Imref. In addition, an output section comprises the addition section 205 and the limiter 204.

The steering wheel damping control section 260 comprises a gain section 261 that multiplies the steering torque Th by a gain Kcp, a differential section 262 that differentiates the steering torque Th, a gain section 263 that multiplies a steering torque Ths differentiated in the differential section 262 by a gain Kcd, and an addition section 264 that adds an output of the gain section 261 and an output of the gain section 263 and outputs the motor current command value Ih.

Figure 14:
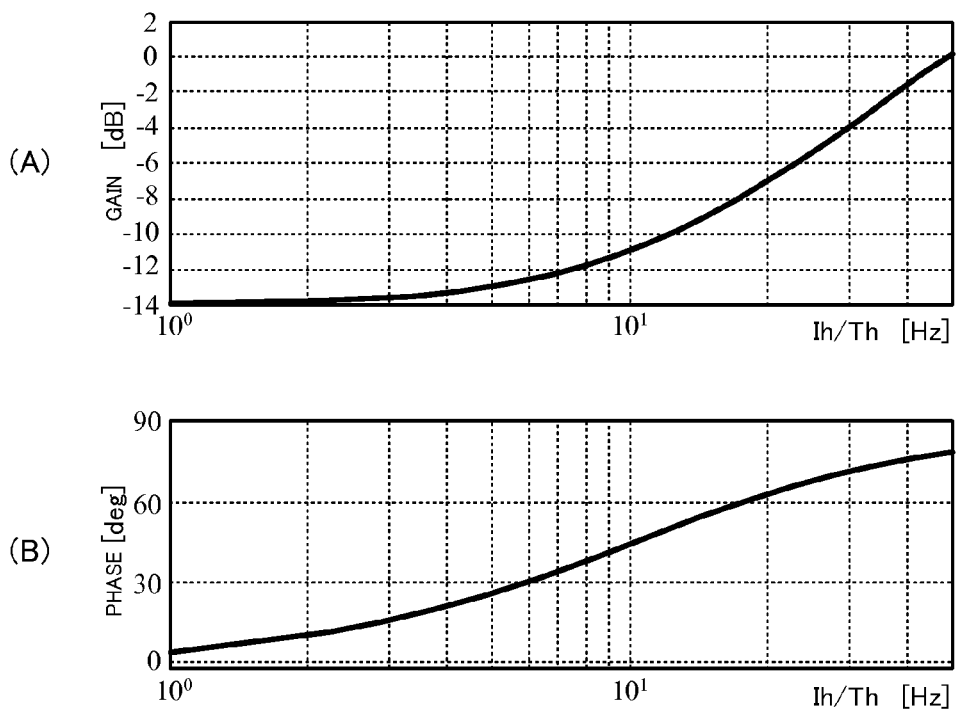
FIG. 14(A) is a gain characteristic diagram showing a characteristic example of a steering wheel damping control section and FIG. 14(B) is a phase characteristic diagram showing the characteristic example of the steering wheel damping control section.

In addition, a relationship between the steering torque Th being an input of the steering wheel damping control section 260 and the motor current command value Ih being an output of the steering wheel damping control section 260 becomes again frequency characteristic (A) and a phase frequency characteristic (B) such as shown in FIG. 14.

Figure 15:
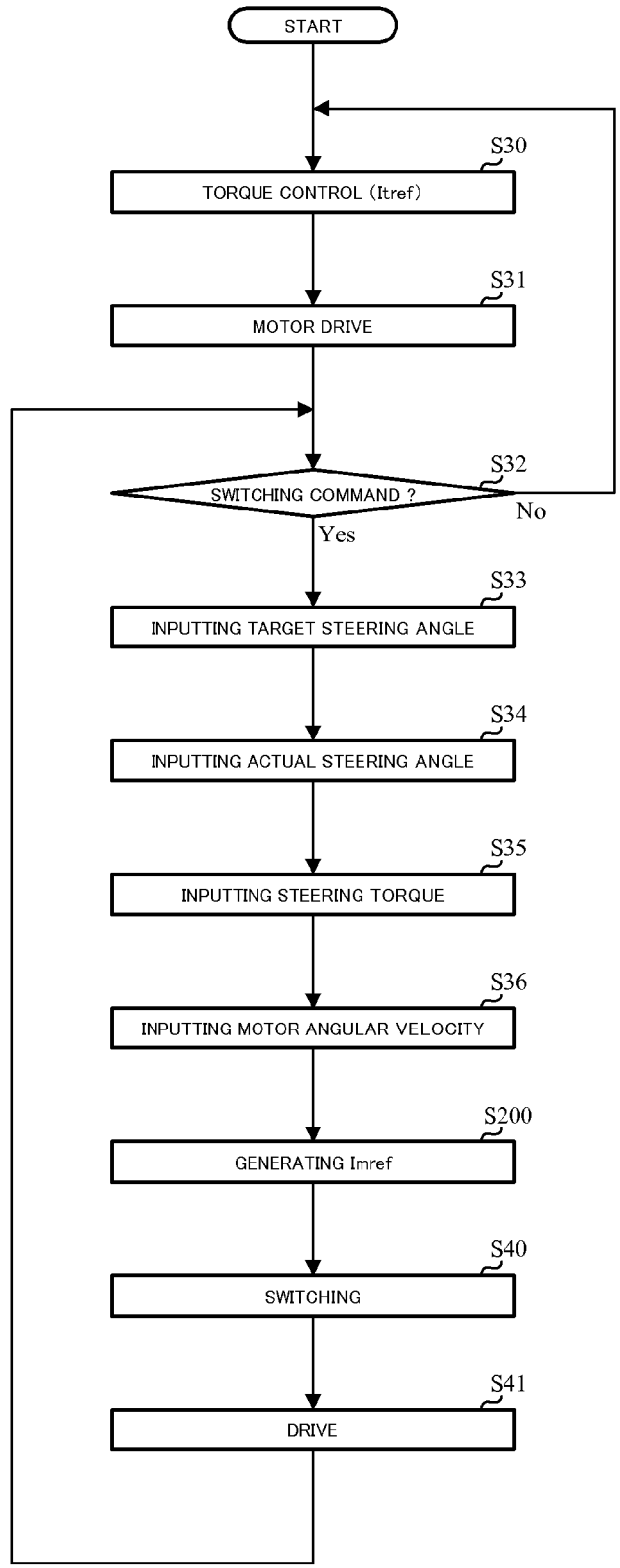
FIG. 15 is a flowchart showing an operation example of the present invention.

In such a configuration, an entire operation example of the present invention will be described with reference to a flowchart shown in FIG. 15.

When the operation of the steering system starts, the torque control by the torque control section 141 is carried out (Step S30), and the motor 150 is driven by using the motor current command value Itref and by means of the current control/drive section 143 (Step S31). The above operations are repeatedly performed until the switching command SW is outputted from the switching command section 131 (Step S32).

When becoming the automatic steering control and the switching command SW is outputted from the switching command section 131, the target steering angle θt is inputted from the target steering angle generating section 132 (Step S33), the actual steering angle θr is inputted from the steering angle sensor 152 (Step S34), the steering torque Th is inputted from the torque sensor 154 (Step S35), the motor angular velocity ω is inputted from the motor angular velocity calculating section 144 (Step S36), and the motor current command value Imref is generated by the steering angle control section 200A (Step S200). Moreover, the target steering angle θt, the actual steering angle θr, the steering torque Th and the motor angular velocity ω can be inputted in an arbitrary order.

Thereafter, the switching section 142 is switched by the switching command SW from the switching command section 131 (Step S40), the motor 150 is driven by using the motor current command value Imref from the steering angle control section 200A and by means of the current control/drive section 143 (Step S41), and a return to the above Step S32 is made. The drive control by the motor current command value Imref is repeatedly performed until the switching command SW is changed from the switching command section 131.

Figure 16:
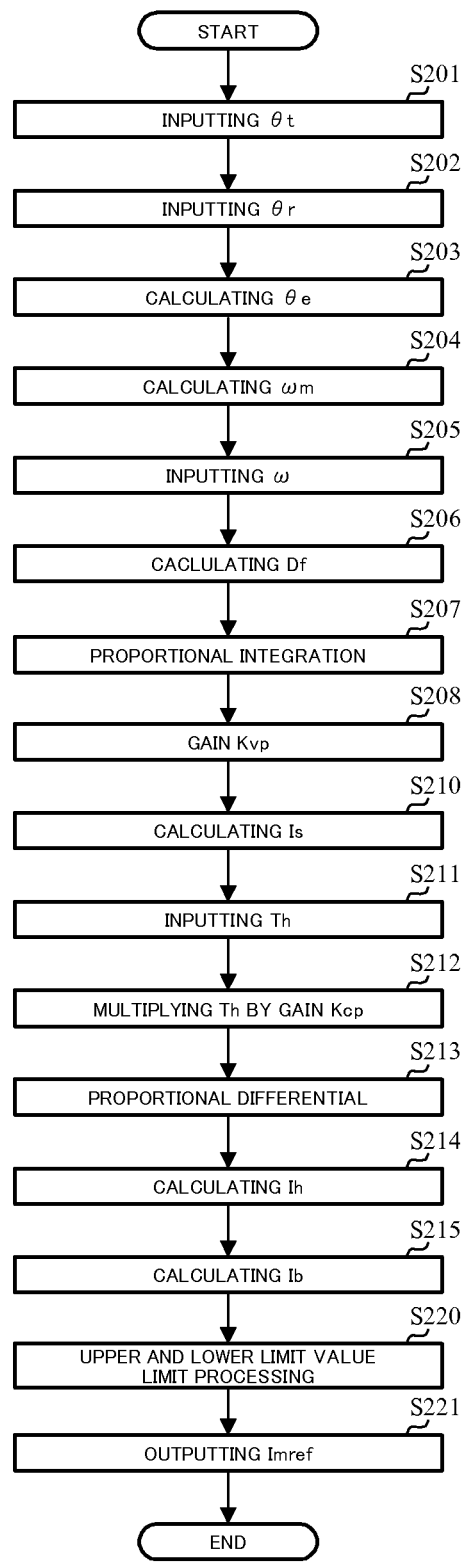
FIG. 16 is a flowchart showing an operation example of the steering angle control section.

Next, an operation example of the steering angle control section 200A will be described with reference to a flowchart shown in FIG. 16.

At first, the target steering angle θt is inputted (Step S201), the actual steering angle θr is inputted (Step S202), a subtraction of "θt−θr" is performed in the subtraction section 202 and the deviation angle ee is calculated (Step S203). The calculated deviation angle ee is inputted into the gain section 241 within the position control section 240 and multiplied by the gain Kpp, the motor velocity command value ωm is calculated (Step S204), and the motor velocity command value ωm is addition-inputted into the subtraction section 251 within the velocity control section 250. The motor angular velocity ω is subtraction-inputted into the subtraction section 251 (Step S205), the velocity deviation Df (=ωm−ω) between the motor velocity command value ωm and the motor angular velocity ω is calculated by the subtraction section 251 (Step S206), the velocity deviation Df is inputted into the proportional integral section 252 to be multiplied by the gain Kvi and integrated (Step S207), and a calculated current command value I1 is addition-inputted into the subtraction section 254. The motor angular velocity ω is inputted into the gain section 253, and a current command value I2 multiplied by the gain Kvp is subtraction-inputted into the subtraction section 254 (Step S208). A deviation (=I1−I2) between the current command value I1 and the current command value I2 is calculated by the subtraction section 254, and outputted as the motor current command value Is from the velocity control section 250 (Step S210).

The steering torque Th is inputted into the gain section 261 and the differential section 262 within the steering wheel damping control section 260 (Step S211), multiplied by the gain Kcp in the gain section 261 and inputted into the addition section 264 (Step S212). The steering torque Th inputted into the differential section 262 is differentiated, the differentiated velocity command value Ths is multiplied by the gain Kcd in the gain section 263 (Step S213), and the addition section 264 adds a calculated motor current command value I4 to a motor current command value I3 from the gain section 261 to calculate the motor current command value Ih (Step S214). The motor current command value Is from the velocity control section 250 and the motor current command value Ih from the steering wheel damping control section 260 are inputted into the addition section 205, the motor current command value Ib is calculated in the addition section 205 (Step S215), the calculated motor current command value Ib is limited by the upper and lower limit values in the limiter 204 (Step S220) and outputted as the motor current command value Ifref (Step S221).

Figure 17:
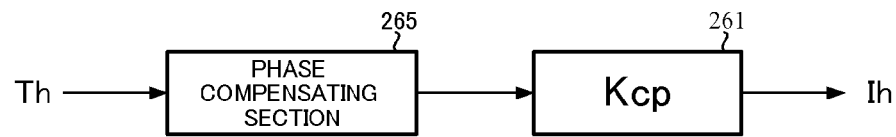
FIG. 17 is a block diagram showing another configuration example of the steering wheel damping control section.

Although the steering wheel damping control section is configured by the torque (gain) and the proportional-differential as described above, as shown in FIG. 17, the same effects can be obtained by performing a phase compensation with respect to the steering torque Th by a phase compensating section 265 and multiplying the phase-compensated steering torque Th by the gain Kcp by the gain section 261 provided at a post-stage of the phase compensating section 265 to calculate the motor current command value Ih.

Further, the compensation gain may be positive or negative, and it is possible to appropriately adjust the resonance frequency and the damping ratio up and down.

Figure 18:
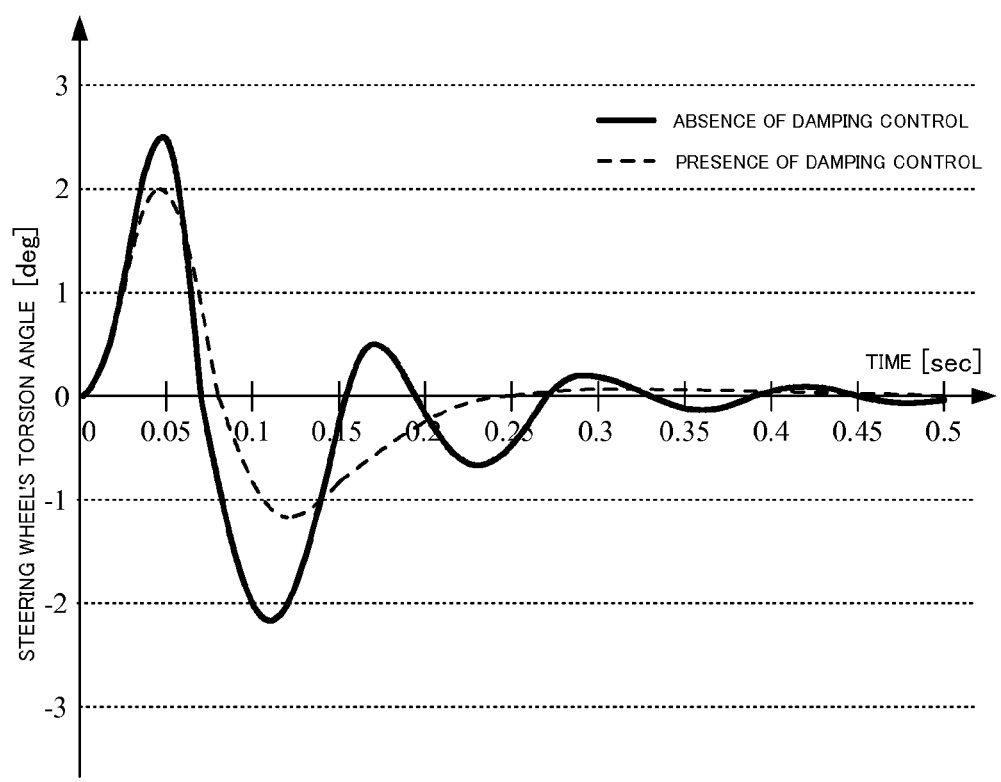
FIG. 18 is a characteristic diagram showing effects of the present invention (the second embodiment).

FIG. 18 shows simulation results of the steering wheel's torsion angle in the case of step-inputting the target steering angle from 0° to 30°. As shown in FIG. 18, the time response in the case of the presence of the damping control is compared with the time response in the case of the absence of the damping control. It is clear that the amplitude and the convergence in the case of the presence of the damping control are improved. It becomes possible to suppress unnecessary vibrations and not to give a discomfort feeling to the driver.

Moreover, in the case of switching the steering mode by the switching section 142, it is also possible to gradually change by using a fade gain. Further, in the above embodiments, although the I-P control is used in the velocity control section, an I-PD control, a modern control, a robust control or the like may be used in the velocity control section.

EXPLANATION OF REFERENCE NUMERALS 1 steering wheel (handle)
2 column shaft (steering shaft, handle shaft)
10,154 torque sensor
12,153 vehicle velocity sensor
13 battery
20,150 motor
21 motor driving section
100 control unit (ECU)
110 torque system control unit
120 motor system control unit
130 vehicle side ECU
131 switching command section
132 target steering angle generating section
140 EPS side ECU
141 torque control section
142 switching section
143 current control/drive section
144 motor angular velocity calculating section
151 rotation angle sensor
152 steering angle sensor
200,200A steering angle control section
201,233 LPF (low pass filter)
210 rate limiter
230 feed-forward control section
231 differential section
240 position control section
250 velocity control section (proportional-lead type PI control)
260 steering wheel damping control section

The invention claimed is:

1. An electric power steering apparatus that calculates a first motor current command value on a basis of a steering torque and a vehicle velocity, performs an assist control of a steering system by driving a motor on the basis of said first motor current command value, and has a function for switching between an automatic steering control and a manual steering control, comprising:
a steering angle control section that calculates a second motor current command value in said automatic steering control so as to bring an actual steering angle close to a target steering angle; and
a switching section that inputs said first motor current command value and said second motor current command value and switches between said first motor current command value and said second motor current command value depending on a switching signal,
wherein said steering angle control section comprises:
a rate limiter that performs smoothing with respect to said target steering angle;
a position control section that inputs a first deviation between an output of said rate limiter and said actual steering angle; and
a velocity control section that inputs a first motor velocity command value from said position control section, obtains a second deviation between said first motor velocity command value and said motor angular velocity, comprises an integral section for inputting said second deviation and a proportional section for inputting said motor angular velocity, subtracts an output of said proportional section from an output of said integral section, and outputs said second motor current command value.

2. The electric power steering apparatus according to claim 1, wherein a first low pass filter is provided at a post-stage of said rate limiter.

3. The electric power steering apparatus according to claim 1, wherein a feedforward control section that velocity-componentizes said output of said rate limiter and adds said velocity-componentized output to said first motor velocity command value is provided.

4. The electric power steering apparatus according to claim 2, wherein a feedforward control section that velocity-componentizes said output of said rate limiter and adds said velocity-componentized output to said first motor velocity command value is provided.

5. The electric power steering apparatus according to claim 3, wherein said feedforward control section comprises a differential section and a gain section.

6. The electric power steering apparatus according to claim 4, wherein said feedforward control section comprises a differential section and a gain section.

7. The electric power steering apparatus according to claim 5, wherein a second low pass filter is provided at an output section of said feedforward control section.

8. The electric power steering apparatus according to claim 6, wherein a second low pass filter is provided at an output section of said feedforward control section.

9. An electric power steering apparatus that calculates a first motor current command value on a basis of a steering torque and a vehicle velocity, performs an assist control of a steering system by driving a motor on the basis of said first motor current command value, and has a function for switching between an automatic steering control and a manual steering control, comprising:
  a steering angle control section that calculates a second motor current command value on the basis of said steering torque, a target steering angle, an actual steering angle and a motor angular velocity of said motor; and
  a switching section that inputs said first motor current command value and said second motor current command value to switch,
  wherein said steering angle control section comprises:
    a position control section that outputs a motor velocity command depending on a deviation angle between said target steering angle and said actual steering angle;
    a velocity control section that inputs said motor velocity command and said motor angular velocity to perform a velocity control;
    a steering wheel damping control section that inputs said steering torque to perform a steering wheel damping control; and
    an output section that processes a third motor current command value from said velocity control section and a fourth motor current command value from said steering wheel damping control section to output said second motor current command value,
  wherein said velocity control section comprises:
    an integral section that integrates a deviation between said motor velocity command and said motor angular velocity;
    a second gain section that multiplies said motor angular velocity by a gain; and
    a subtraction section that obtains a deviation between an output of said integral section and an output of said second gain section,
  wherein said switching section is switched depending on a switching command of said automatic steering control and said manual steering control, said motor is drive-controlled on the basis of said second motor current command value in said automatic steering control.

10. The electric power steering apparatus according to claim 9, wherein said position control section is a first gain section.

11. The electric power steering apparatus according to claim 9, wherein said steering wheel damping control section comprises
  a third gain section that multiplies said steering torque by a gain; and
  a differential gain section that differentiates said steering torque and multiplies said differentiated steering torque by a gain.

12. The electric power steering apparatus according to claim 10, wherein said steering wheel damping control section comprises
  a third gain section that multiplies said steering torque by a gain; and
  a differential gain section that differentiates said steering torque and multiplies said differentiated steering torque by a gain.

13. The electric power steering apparatus according to claim 9, wherein said steering wheel damping control section comprises a phase compensating section that performs a phase compensation with respect to said steering torque and a fourth gain section.

14. The electric power steering apparatus according to claim 10, wherein said steering wheel damping control section comprises a phase compensating section that performs a phase compensation with respect to said steering torque and a fourth gain section.

15. The electric power steering apparatus according to claim 11, wherein said steering wheel damping control section comprises a phase compensating section that performs a phase compensation with respect to said steering torque and a fourth gain section.

16. The electric power steering apparatus according to claim 12, wherein said steering wheel damping control section comprises a phase compensating section that performs a phase compensation with respect to said steering torque and a fourth gain section.

17. The electric power steering apparatus according to claim 9, wherein said output comprises an addition section and a limiter that limits upper and lower limit values.

18. The electric power steering apparatus according to claim 10, wherein said output comprises an addition section and a limiter that limits upper and lower limit values.

19. The electric power steering apparatus according to claim 11, wherein said output comprises an addition section and a limiter that limits upper and lower limit values.

20. The electric power steering apparatus according to claim 12, wherein said output comprises an addition section and a limiter that limits upper and lower limit values.

* * * * *